(12) United States Patent
Darisala et al.

(10) Patent No.: US 8,745,282 B2
(45) Date of Patent: Jun. 3, 2014

(54) CONCURRENT RESPONSE FOR DEVICE INFORMATION DURING AN INITIALIZATION PROCESS FOR A STORAGE DEVICE

(75) Inventors: Sandeep Darisala, Bangalore (IN); Sathya Prakash Veerichetty, Bangalore (IN); Travis Veldkamp, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 103 days.

(21) Appl. No.: 13/156,061

(22) Filed: Jun. 8, 2011

(65) Prior Publication Data

US 2012/0317315 A1  Dec. 13, 2012

(51) Int. Cl.
*G06F 3/00* (2006.01)
*G06F 5/00* (2006.01)
*G06F 13/38* (2006.01)

(52) U.S. Cl.
USPC .................................. 710/10; 710/36; 710/62

(58) Field of Classification Search
USPC ................................................ 710/10, 36, 62
See application file for complete search history.

(56) References Cited

U.S. PATENT DOCUMENTS

| | | | |
|---|---|---|---|
| 7,613,879 B2 | 11/2009 | Cherian et al. | |
| 2006/0242312 A1* | 10/2006 | Crespi et al. | 709/230 |
| 2009/0007155 A1* | 1/2009 | Jones et al. | 719/327 |
| 2009/0172448 A1* | 7/2009 | Igari | 713/323 |
| 2009/0177840 A1 | 7/2009 | Dale et al. | |

* cited by examiner

*Primary Examiner* — Zachary K Huson
(74) *Attorney, Agent, or Firm* — Duft Bornsen & Fettig

(57) ABSTRACT

Methods operable on a storage controller and related structure are provided for responding to inquiry commands from a host for a storage device. A command requesting information about a storage device is received from a host. In response to the command, the storage controller determines that the storage device is not initialized, and begins an initialization process for the storage device. Information received from the storage device during the initialization process is stored for completing a response to the inquiry. A response to the inquiry is transmitted to the host based on the stored information to complete the inquiry without waiting for the storage device to complete the initialization.

13 Claims, 4 Drawing Sheets

CONCURRENT RESPONSE FOR DEVICE INFORMATION DURING AN INITIALIZATION PROCESS FOR A STORAGE DEVICE

BACKGROUND

1. Field of the Invention

The invention relates generally to storage controllers, and more specifically, relates to responding to inquiry commands from a host for a storage device during an initialization process for the storage device.

2. Discussion of Related Art

Small Computer Systems Interface ("SCSI") is a set of American National Standards Institute ("ANSI") standard electronic interface specification that allows, for example, computers to communicate with peripheral hardware. Common SCSI compatible peripheral devices may include: disk drives, tape drives, CD drives ("CD-ROM", "CD-RW", etc.), DVD drives, printers and scanners. SCSI as originally created included both a command/response data structure specification and an interface and protocol standard for a parallel bus structure for attachment of devices. SCSI has evolved from exclusively parallel interfaces to include both parallel and serial interfaces. "SCSI" is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. The serial interface transport media standards that support SCSI command processing include: Fibre Channel, Serial Bus Protocol (used with the Institute of Electrical and Electronics Engineers 1394 FireWire physical protocol; "IEEE 1394") and the Serial Storage Protocol (SSP).

SCSI interface transports and commands may be used to interconnect storage devices with one or more storage controllers. For example, serial SCSI transport media and protocols such as Serial Attached SCSI ("SAS") and Serial Advanced Technology Attachment ("SATA") may be used by storage controllers to communicate with the storage devices. A host system in communication with a storage controller may then issue one or more Input Output ("IO") operations for a storage device. Those skilled in the art are familiar with SAS and SATA standards as well as other SCSI related specifications and standards. Information about such interfaces and commands is generally obtainable at the website http://www.t10.org.

Storage devices (e.g., SATA storage devices) typically require an initialization process prior to responding to normal IO operations issued by a host. The process of initializing a storage device includes transmitting a sequence of commands to the storage device to place the storage device into a known state. This process may be performed by the storage controller that couples one or more storage devices with the host. In SATA devices, many drive settings are lost when the device is power cycled or reset.

In some cases, a storage controller may postpone initialization of the storage device until the host issues the first IO operation to the storage device. When the first IO arrives at the storage controller, the storage controller pushes the IO operation to a command queue and begins the initialization process for the storage device. After the storage device is initialized, the storage controller pops the IO operation off of the command queue and issues the IO operation to the storage device. When the host issues the first IO to the storage device and the storage device is not initialized, a delay occurs before the storage controller issues the IO to the storage device until after the storage device is initialized. This delay may cause the host to suspend some activities while waiting for a response to the IO. For example, when the host is booting, the host may issue inquiry commands to the storage controller for storage devices. A delay in responding to the inquiry commands may stall the host's boot process and increase the time it takes to boot the host.

Thus it is an ongoing challenge to minimize the delay in responding to the first IO issued by the host to a storage device that is not initialized.

SUMMARY

The present invention solves the above and other problems, thereby advancing the state of the useful arts, by providing methods and related structure for reducing the delay in responding to inquiry commands from a host for a storage device when the storage device is not initialized by beginning an initialization process for the storage device and responding to the inquiry based on information derived during the initialization process. This allows the host to receive a response to the inquiry command before the storage device has completed initialization, reducing the delay in responding to the inquiry.

In one aspect hereof, an enhanced storage controller is provided for responding to host inquiry commands for a storage device. The storage controller includes a memory communicatively coupled with a control system. The memory stores commands received from the host in a command queue. The control system receives a first command for a storage device from a host. The first command requests information about the storage device. In response to the first command, the control system determines that the storage device is not initialized, and begins an initialization process for the storage device. In response to beginning the initialization process, the control system transmits a second command to the storage device, where the second command requests information about the storage device, and receives a first response from the storage device in response to the second command, where the first response includes information about the storage device. The control system transmits a second response to the host, where the second response is based on the first response from the storage device, and where the second response is transmitted to the host before another transmission of the second command to the storage device. The control system then completes the initialization of the storage device in response to transmitting the second response to the host In another aspect hereof, a method operable on a storage controller is provided for responding to host inquiry commands for a storage device. A first command is received for a storage device from a host. The first command requests information about the storage device. In response to the first command, the storage controller determines that the storage device is not initialized, and begins an initialization process for the storage device by performing the steps of: transmitting a second command to the storage device, where the second command requests information about the storage device, and receiving a first response from the storage device in response to the second command, where the first response includes information about the storage device. The storage controller transmits a second response to the host, where the second response is based on the first response from the storage device, and where the second response is transmitted to the host before another transmission of the second command to the storage device. The storage controller completes the initialization of the storage device in response to transmitting the second response to the host.

In another aspect hereof, another method operable on a storage controller is provided for responding to inquiry commands from a host for a storage device. A SCSI Inquiry for a SATA storage device is received from a host. In response to the SCSI Inquiry command, the storage controller determines that the storage device is not initialized, and begins an initialization process for the storage device. Information received from the storage device during the initialization process is stored for completing the SCSI Inquiry. A SCSI Inquiry response is transmitted to the host based on the stored information to complete the SCSI Inquiry.

DETAILED DESCRIPTION OF THE DRAWINGS

Figure 1:
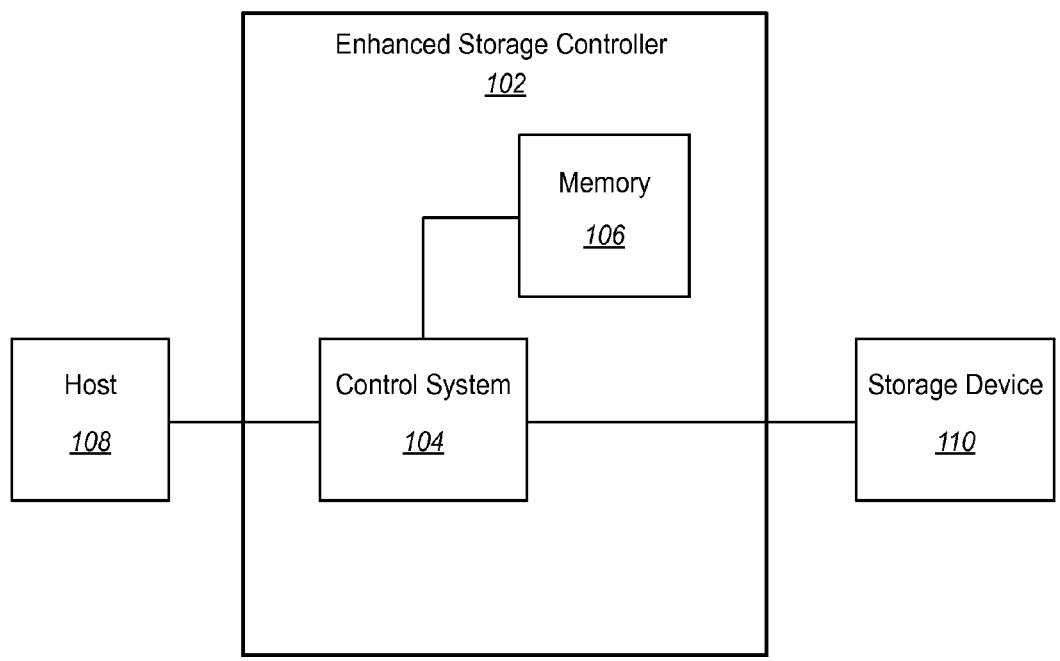
FIG. 1 is a block diagram of an exemplary enhanced storage controller in accordance with features and aspects hereof for responding to inquiry commands from a host for a storage device.

FIG. 1 is a block diagram of an exemplary enhanced storage controller 102 in accordance with features and aspects hereof for responding to inquiry commands from a host 108 for a storage device 110. Although only one storage device 110 and host 108 are depicted in FIG. 1, one skilled in the art will understand that storage controller 102 may couple a plurality of storage devices with one or more hosts. Storage controller 102 includes a control system 104 that is adapted to process IO requests from host 108 for storage device 110. Generally, host 108 issues IO requests for reading data from or writing data to storage device 110. Host 108 may also generate requests for storage device 110 to determine the status of storage device 110. Control system 104 may include one or more processors executing firmware stored in memory 106 and/or programmable logic devices, etc. In FIG. 1, storage controller 102 has been enhanced to concurrently perform an initialization process for storage device 110 and to respond to an IO request from host 108. This allows storage controller 108 to respond to IO requests from host 108 in a more timely fashion.

Storage controller 102 also includes a memory 106 that is adapted to store programmed instructions and data. Memory 106 may include command queues or other such data structures for queuing IO commands generated by host 108. Storage device 110 may include one or more optical or magnetic disk drives, flash memory drives, RAM disks, solid state drives ("SSD's"), etc. Further, storage device 110 may be part of a Redundant Array of Inexpensive Disks ("RAID") managed by control system 104 of controller 102. Storage controller 102 is coupled with storage device 110 using any suitable communication medium and protocol, for example, SATA, SAS, etc. For example, storage controller 102 may be a SAS controller operating in an initiator mode that is directly coupled with a SATA storage device (communicating directly via ATA) and/or coupled through a SAS expander with a SATA storage device (communicating via SATA Tunnel Protocol ("STP")).

Host system 108 may be any suitable computing devices/systems including, for example, servers, workstations, PCs, etc. Host system 108 is coupled with storage controller 102 using any suitable communication medium and protocol including, for example, Ethernet, SAS, SATA, Fibre Channel, Peripheral Component Interconnect ("PCI"), PCI eXtended ("PCI-X"), PCI Express ("PCI-E"), etc.

In some cases, host 108 may issue one or more inquiry commands for storage device 110. An inquiry command may, for example, request information about the identity and/or status of storage device 110 (e.g., physical size of storage device 110, spin status, ready status, product ID, vendor ID, etc.). Such a request may be generated by host 108 during a boot process. During boot, host 108 may query one or more storage devices (e.g., storage device 110) prior to initializing internal data structures for reading from, or writing to, storage device 110.

As noted above, storage controller 102 may not initialize storage device 110 prior to receiving IO requests from host 108 for storage device 110. It may be desirable to wait to initialize storage device 110 until receiving IO requests in order to improve the boot time for storage controller 102. When storage controller 102 communicates with a large number of storage devices, initializing each of the devices when storage controller 102 boots may take a significant amount of time. Therefore, storage controller 102 may wait to initialize the storage devices until after receiving an IO request for a storage device.

Typically, a storage device (e.g., storage device 110) would be initialized prior to responding to an IO request from a host (e.g., host 108). However, performing an initialization process includes a sequence of commands and responses between storage controller 102 and storage device 110. Thus, a finite amount of time is necessary to perform the initialization process. This may cause a delay in responding to the IO request from host 108 when storage device 110 is uninitialized.

In FIG. 1, storage controller 102 is enhanced in accordance with features and aspects hereof to reduce the delay in responding to an inquiry command from a host for a storage device when the storage device is not initialized by beginning an initialization process for the storage device and responding to the host inquiry during the initialization process. This allows the host to receive a response to inquiry commands issued by the host before the storage device has completed initialization, reducing the delay in responding to the inquiry. During operation, storage controller 102 may receive commands from a host (e.g., host 108) requesting information about one or more storage devices (e.g., storage device 110). Storage controller 102 determines if the target for the command (i.e., the storage device) is initialized or not initialized. When the storage device is not initialized, then storage controller 102 begins an initialization process for the storage device. More particularly, storage controller 102 will transmit one or more commands to the storage device requesting information about the storage device as part of the initialization process. Storage controller 102 may then receive one or more responses from the storage device that includes information about the storage device. Based on the received information, storage controller 102 transmits a response to the host to respond to the request for information. Storage controller 102 responds to the request before transmitting additional commands to the storage device requesting information about the storage device. Storage controller 102 then completes the initialization of the storage device.

Figure 2:
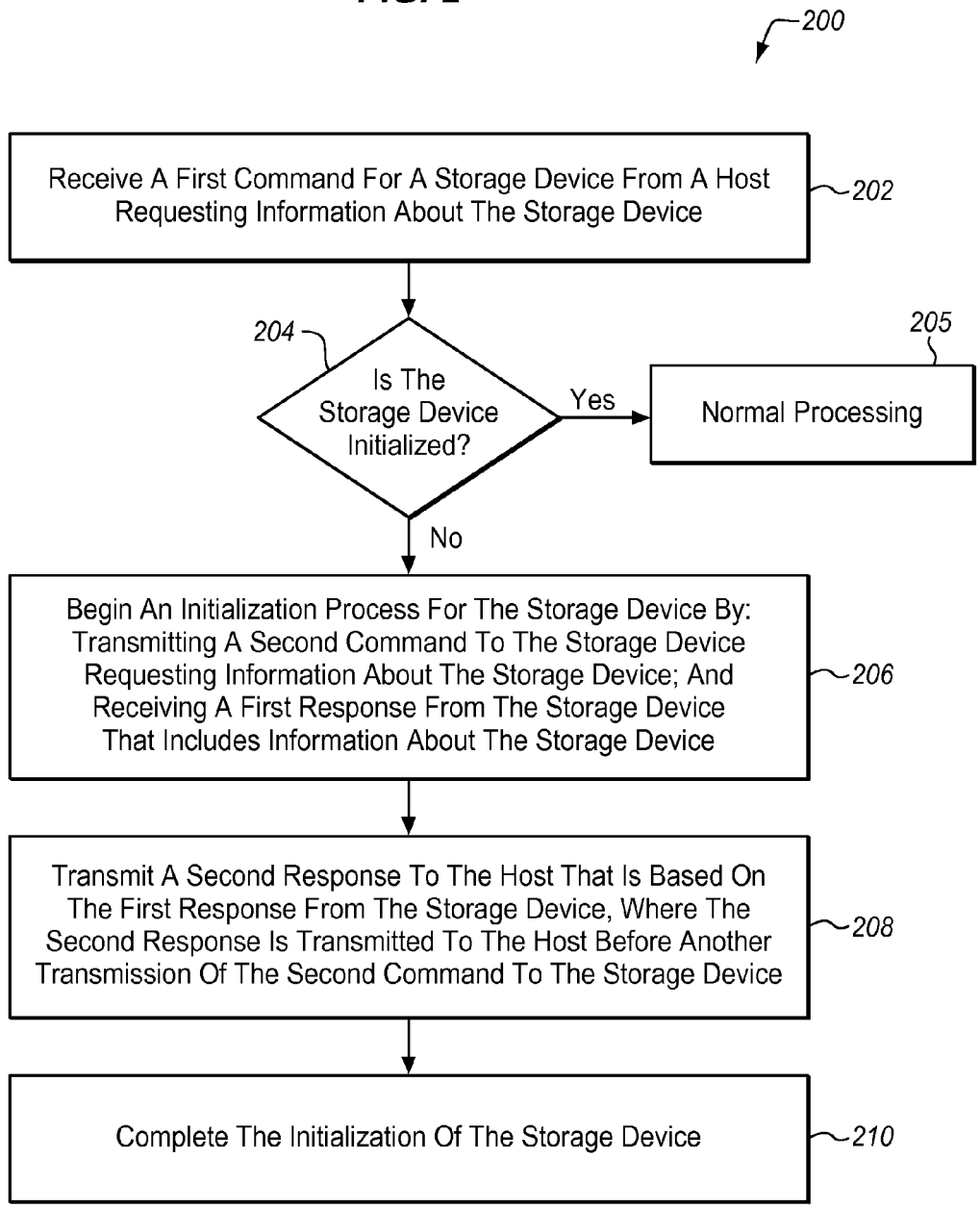
FIG. 2 is a flowchart describing an exemplary method in accordance with features and aspects hereof for responding to inquiry commands from a host for a storage device.

FIG. 2 is a flowchart describing an exemplary method 200 in accordance with features and aspects hereof for responding to inquiry commands from a host for a storage device. The steps of method 200 may be performed by storage controller 102 of FIG. 1, although one skilled in the art will understand that the steps may be performed by other systems not shown. Further, the steps may include other steps not shown for the sake of brevity, and/or may be performed in an alternate order.

A storage controller (e.g., storage controller 102) receives a first command for a storage device (e.g., storage device 110) from a host (e.g., host 108). The command requests information about the storage device. Such a request may include queries about the spin state, (e.g., idle, running), the logical size, interface rate, current status, product ID, vendor ID, etc., for the storage device (step 202 of FIG. 2). In response to receiving the command or request from the host, the storage controller determines if the storage device is initialized or not initialized (step 204). If the storage device is initialized, then the storage controller performs typical IO processing to respond to the request (step 205). If the storage device is not initialized, then the storage controller begins an initialization process (step 206). Such an initialization process may include transmitting one or more commands to the storage device, analyzing responses from the storage device, etc. The initialization process may include transmitting a second command to the storage device requesting information about the storage device, and receiving a first response from the storage device that includes information about the storage device. In response to receiving the information about the storage device, the storage controller transmits a second response to the host before transmitting additional second commands to the storage device (step 208). The storage controller then completes the initialization of the storage device (step 210).

For example, host 108 may transmit SCSI Inquiry commands to control system 104 to determine the status of a SATA storage device 110. In response to the SCSI Inquiry command, control system 104 may determine that storage device 110 is not initialized, and therefore, begin an initialization process for storage device 110. During the initialization process, control system 104 may identify or acquire information that is sufficient to satisfy the SCSI Inquiry from host 108. Rather than waiting until initialization is complete and issuing a separate inquiry command (e.g., an Identify Device ATA command) to storage device 110, control system 104 will respond to the host inquiry during the initialization process with the information about storage device 110 that was gathered during the initialization process. This allows controller 102 to respond to inquiry commands generated by host 108 without waiting for storage device 110 to finish initializing. As the initialization process takes a finite amount of time, storage controller 102 operates faster in responding to the inquiry from host 108.

Figure 3:
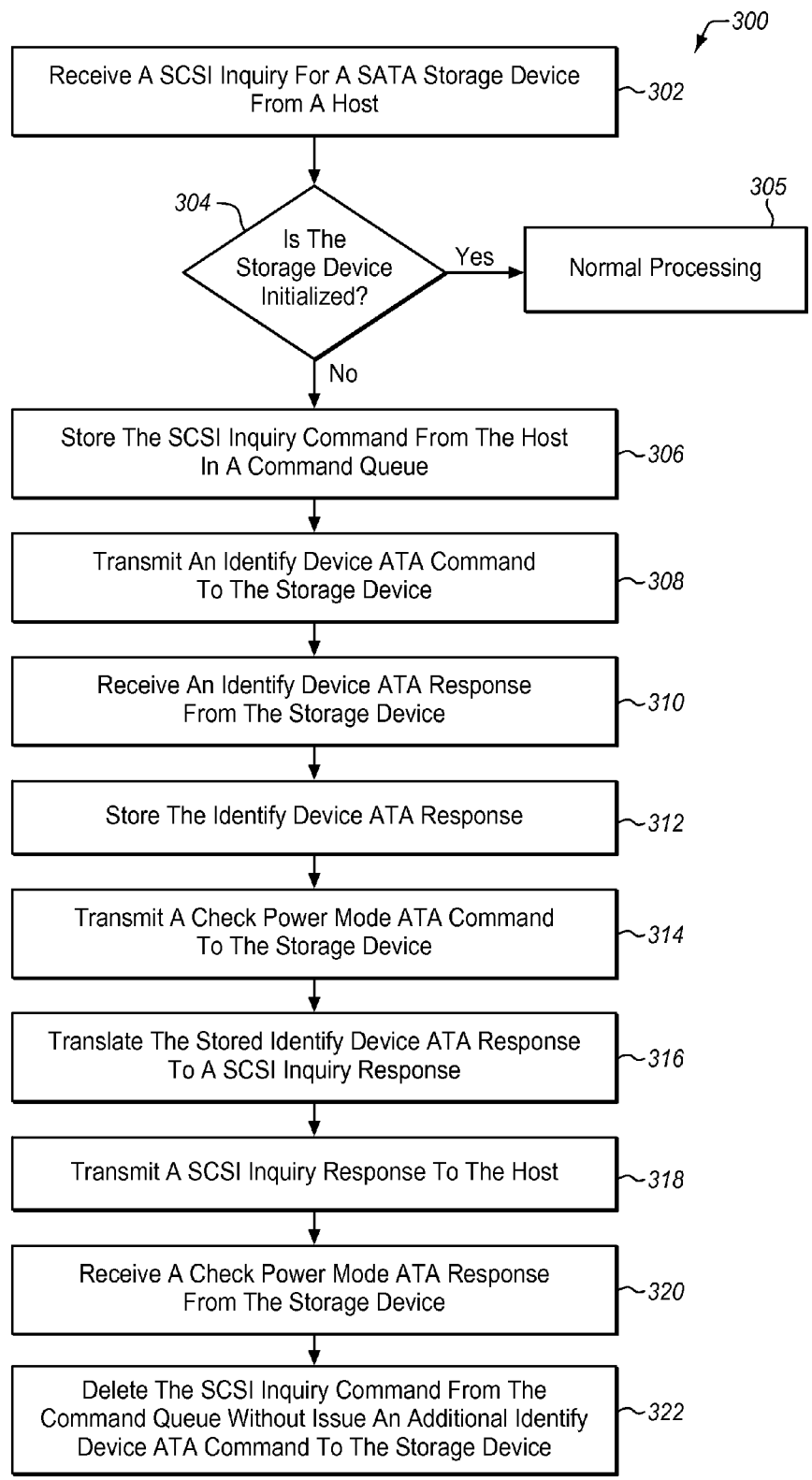
FIG. 3 is a flowchart describing another exemplary method in accordance with features and aspects hereof for responding to inquiry commands from a host for a storage device.

FIG. 3 is a flowchart describing another exemplary method 300 in accordance with features and aspects hereof for responding to inquiry commands from a host for a storage device. The steps of method 300 may be performed by storage controller 102 of FIG. 1, although one skilled in the art will understand that the steps may be performed by other systems not shown. Further, the steps may include other steps not shown for the sake of brevity, and/or may be performed in an alternate order. In addition, although method 300 will be discussed with regard to SCSI Inquiry commands, one skilled in the art will understand that other commands issued by a host for a storage device may initiate an initialization process for the storage device. Such commands may include Test Unit Ready commands, Read Capacity commands, etc.

A storage controller (e.g., storage controller 102) receives a SCSI Inquiry command for a SATA storage device (e.g., storage device 110) from a host (e.g., host 108, step 302 of FIG. 3). The format and use of SCSI Inquiry commands for retrieving information about storage devices is well known to one skilled in the art, and will not be elaborated upon here. In response to receiving the SCSI Inquiry from the host, the storage controller determines if the storage device is initialized or not initialized (step 304). If the storage device is initialized, then the storage controller performs typical IO processing (step 305). If the storage device is not initialized, then the storage controller stores or pends the SCSI Inquiry command in a command queue (e.g., memory 106, step 306). As part of an initialization process, an Identify Device ATA command is transmitted to the storage device (step 308). After receiving the Identify Device command, the storage device generates and transmits an Identify Device ATA response back to the storage controller, allowing the storage controller to receive the information about the storage device (step 310). The storage controller stores information based on the Identify Device ATA response sent by the storage device (step 312) and transmits a Check Power Mode ATA command to the storage device (step 314). The Check Power Mode ATA command is part of the initialization process for the storage device. After the storage controller transmits the Check Power Mode ATA command, the storage controller translates the Identify Device ATA response from the storage device into a SCSI Inquiry response for the host (step 316) and transmits a SCSI Inquiry response to the host (step 318). The controller may asynchronously receive a Check Power Mode ATA response from the storage device (step 320) either during or after steps 316 and/or 318. In some cases, the storage controller may be able to translate the Identify Device ATA command and transmit a SCSI inquiry response to the host during a window generated between transmitting the Check Power Mode ATA command to the storage device and receiving the Check Power Mode ATA response from the storage device. Responding to the SCSI Inquiry command during this window allows the storage controller to continue with an initialization process for the storage device while responding to the SCSI Inquiry from the host.

The storage controller may then delete the queued or pending SCSI Inquiry command from the command queue without issuing a new or additional Identify Device ATA command to the storage device (step 322). The storage controller may also issue additional commands to the storage device as part of the initialization process, such as setting up the PIO transfer mode, setting up the DMA transfer mode, enabling/disabling the read and/or write cache on the storage device, issuing an Execute Device Diagnostics command, etc. By responding to the SCSI Inquiry command during the initialization process for the storage device instead of waiting for the initialization to complete, the storage controller may advantageously respond to the SCSI Inquiry received from the host faster. This allows the host to continue with startup processing and/or activities related to the SCSI Inquiry command.

Figure 4:
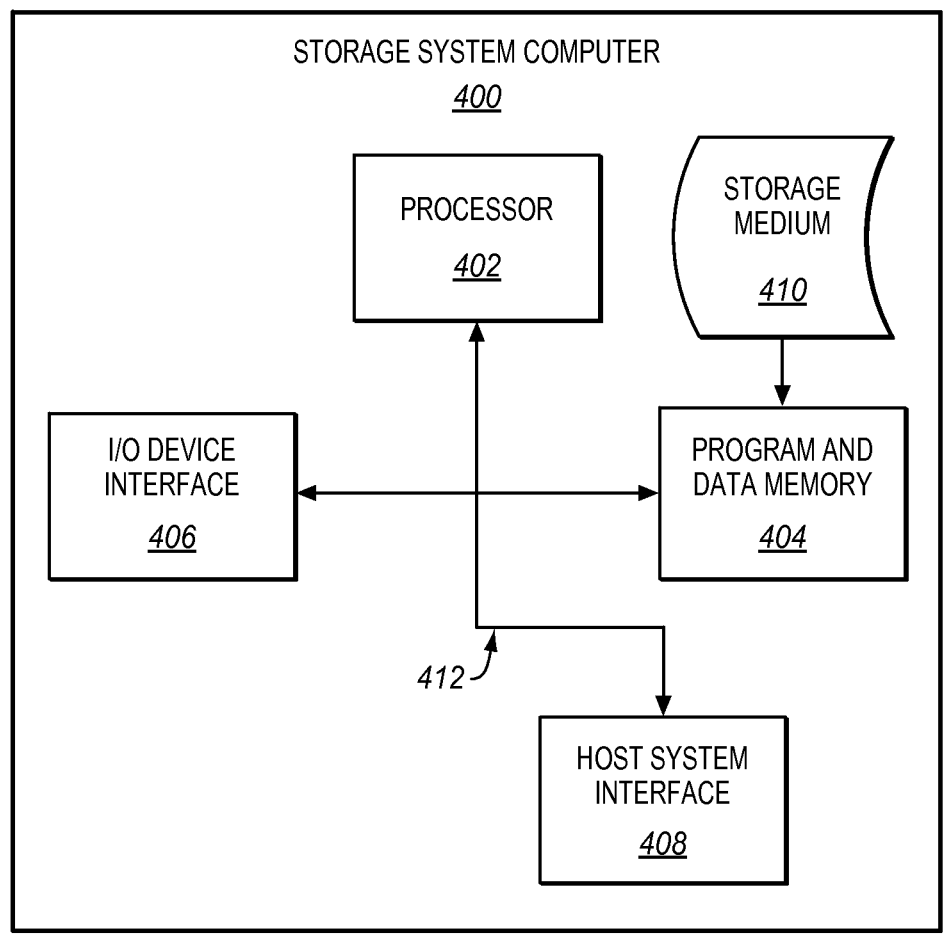
FIG. 4 is a block diagram of an exemplary storage system computer that uses a computer readable medium to load programmed instructions for performing methods in accordance with features and aspects hereof for responding to inquiry commands from a host for a storage device.

Embodiments of the invention can take the form of an entirely hardware (i.e., circuits) embodiment, an entirely software embodiment or an embodiment containing both hardware and software elements. In one embodiment, the invention is implemented in software, which includes but is not limited to firmware, resident software, microcode, etc. FIG. 4 is a block diagram depicting a storage system computer 400 adapted to provide features and aspects hereof by executing programmed instructions and accessing data stored on a computer readable storage medium 410. Computer 400 may be a computer such as embedded within the storage controller of a storage system that responds to host inquiry commands for a storage device in accordance with features and aspects hereof.

Furthermore, embodiments of the invention can take the form of a computer program product accessible from a computer-usable or computer-readable medium 410 providing program code for use by, or in connection with, a computer or any instruction execution system. For the purposes of this description, a computer-usable or computer readable medium can be any non-transitory apparatus that can contain, store, communicate, propagate, or transport the program for use by or in connection with the computer, instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A storage system computer 400 suitable for storing and/or executing program code will include at least one processor 402 coupled directly or indirectly to memory elements 404 through a system bus 412. The memory elements 404 can include local memory employed during actual execution of the program code, bulk storage, and cache memories that provide temporary storage of at least some program code in order to reduce the number of times code must be retrieved from bulk storage during execution.

Input/output interface 406 couples the computer to I/O devices to be controlled (e.g., storage devices, etc.). Host system interface 408 may also couple the computer 400 to other data processing systems.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method operable on a Host Bus Adapter (HBA) for responding to Small Computer System Interface (SCSI) inquiry commands for a Serial Advanced Technology Attachment (SATA) storage device from a host computer, the method comprising:
   receiving, by the HBA, a SCSI inquiry command from the host computer requesting information about the SATA storage device;
   determining, by the HBA, that the SATA storage device is not initialized for Input/Output (I/O) operations for the host computer;
   beginning, by the HBA, an initialization process for the SATA storage device by:
      transmitting an Identify Device Advanced Technology Attachment (ATA) command to the SATA storage device; and
      receiving an Identify Device ATA response from the SATA storage device;
   generating, by the HBA, a SCSI inquiry response for the host computer based on the Identify Device ATA response from the SATA storage device;
   transmitting, by the HBA, the SCSI inquiry response to the host computer before transmitting another Identify Device ATA command to the SATA storage device; and
   completing, by the HBA, the initialization of the SATA storage device.

2. The method of claim 1 further comprising:
   storing, by the HBA, the SCSI inquiry command from the host computer in a command queue;
   determining, by the HBA, that the Identify Device ATA response received from the SATA storage device during the initialization process includes the information about the SATA storage device requested by the SCSI inquiry command; and
   deleting, by the HBA, the SCSI inquiry command from the command queue without transmitting an Identify Device ATA command to the SATA storage device responsive to the determination.

3. The method of claim 1 wherein:
   the step of beginning the initialization process for the SATA storage device further comprises:
      transmitting a Check Power Mode ATA command to the SATA storage device in response to receiving the Identify Device ATA response;
   the step of completing the initialization of the SATA storage device further comprises:
      receiving a Check Power Mode ATA response from the SATA storage device; and
      processing the Check Power Mode ATA response from the SATA storage device; and
   the step of transmitting the inquiry response to the host computer is performed within a window of time bounded by the transmitting of the Check Power Mode ATA command and the receiving of the Check Power Mode ATA response.

4. A Host Bus Adapter (HBA) communicatively coupling a Serial Advanced Technology Attachment (SATA) storage device with a host computer, the HBA comprising:
   a memory operable to store commands received from the host computer in a command queue; and
   a control system communicatively coupled with the memory, the control system operable to receive a Small Computer System Interface (SCSI) inquiry command for the SATA storage device from the host computer,
   wherein the control system is further operable to store the SCSI inquiry command in the command queue, and to determine that the SATA storage device is not initialized for Input/Output (I/O) operations for the host computer,
   wherein the control system is further operable to begin an initialization process for the SATA storage device,
   wherein the control system, in response to beginning the initialization process, is further operable to transmit an Identify Device Advanced Technology Attachment (ATA) command to the SATA storage device, and to receive an Identify Device ATA response from the SATA storage device,
   wherein the control system further operable to generate a SCSI inquiry response for the host computer based on the Identify Device ATA response from the SATA storage device, and to transmit the SCSI inquiry response to the host computer before transmission of another Identify Device ATA command to the SATA storage device, and wherein the control system is further operable to complete the initialization of the SATA storage device.

5. The HBA of claim 4, wherein the control system is further operable to determine that the Identify Device ATA response received from the SATA storage device during the initialization process includes the information about the SATA storage device requested by the SCSI inquiry command, and to delete the SCSI inquiry command from the command queue without transmitting an Identify Device ATA command to the SATA storage device responsive to the determination.

6. The HBA of claim 4, wherein:
the control system is further operable to transmit a Check Power Mode ATA command to the SATA storage device in response to receiving the Identify Device ATA response,
the control system is further operable to receive a Check Power Mode ATA response from the SATA storage device, and to process the Check Power Mode ATA response from the SATA storage device, and
the control system is further operable to transmit the SCSI inquiry response to the host computer within a window of time bounded by the transmitting of the Check Power Mode ATA command and the receiving of the Check Power Mode ATA response.

7. A method operable on a Host Bus Adapter (HBA) for responding to host inquiry commands for a storage device, the method comprising:
receiving, by the HBA, a Small Computer System Interface (SCSI) Inquiry for a Serial Advanced Technology Attachment (SATA) storage device from a host computer;
determining, by the HBA, that the SATA storage device is not initialized for Input/Output (I/O) operations for the host computer;
beginning, by the HBA, an initialization process for the SATA storage device;
storing, by the HBA, Identify Device Advanced Technology Attachment (ATA) information received from the SATA storage device during the initialization process for completing the SCSI Inquiry from the host computer; and transmitting, by the HBA, a SCSI Inquiry response to the host computer based on the stored Identify Device ATA information to complete the SCSI Inquiry.

8. The method of claim 7 further comprising:
storing, by the HBA, the SCSI Inquiry command from the host computer in a command queue;
determining, by the HBA, that the Identify Device ATA information received from the SATA storage device during the initialization process includes information about the SATA storage device requested by the SCSI Inquiry command; and
deleting, by the HBA, the SCSI Inquiry command from the command queue without transmitting an Identify Device ATA command to the SATA storage device responsive to the determination.

9. The method of claim 7 wherein:
the step of beginning further comprises:
transmitting an Identify Device Advanced Technology Attachment (ATA) command to the SATA storage device; and
receiving an Identify Device ATA response from the SATA storage device; and
the step of transmitting the SCSI Inquiry response further comprises:
translating the stored Identify Device ATA response to a SCSI Inquiry response.

10. The method of claim 9 wherein:
the step of beginning further comprises:
transmitting a Check Power Mode ATA command to the SATA storage device responsive to receiving the Identify Device ATA response; and
receiving a Check Power Mode ATA response from the SATA storage device; and
the step of transmitting the SCSI Inquiry response to the host computer is performed within a window of time bounded by the transmitting of the Check Power Mode ATA command and the receiving of the Check Power Mode ATA response.

11. The method of claim 7 wherein the HBA is a Serial Attached SCSI ("SAS") controller.

12. The method of claim 11 wherein the HBA communicates to the SATA storage device using SATA Tunnel Protocol ("STP").

13. The method of claim 7 wherein the HBA is a SATA storage controller.

* * * * *